E. B. PETERSON.
FRICTION CLUTCH.
APPLICATION FILED MAY 26, 1910.

1,006,500.

Patented Oct. 24, 1911.

WITNESSES.
C. G. Bradley
J. H. Thurston

INVENTOR.
Erick B. Peterson,
By Wilmarth H. Thurston,
ATTORNEY.

UNITED STATES PATENT OFFICE.

ERICK B. PETERSON, OF PROVIDENCE, RHODE ISLAND, ASSIGNOR TO GEORGE W. DOVER, OF CRANSTON, RHODE ISLAND.

FRICTION-CLUTCH.

1,006,500.

Specification of Letters Patent.

Patented Oct. 24, 1911.

Application filed May 26, 1910. Serial No. 563,573.

*To all whom it may concern:*

Be it known that I, ERICK B. PETERSON, of the city and county of Providence and State of Rhode Island, have invented certain new and useful Improvements in Friction-Clutches; and I do hereby declare the following specification, taken in connection with the accompanying drawings, forming a part of the same, to be a full, clear, and exact description thereof.

The object of the present invention is to provide a friction clutch which will be simple in construction and quick and efficient in operation.

The invention consists in providing each of two shafts or other parts to be rotatively connected with a recess, and in the combination with said parts of a spiral spring having one end inserted in the recess in one of said parts and the other end inserted in the recess in the other part.

Figure 2:
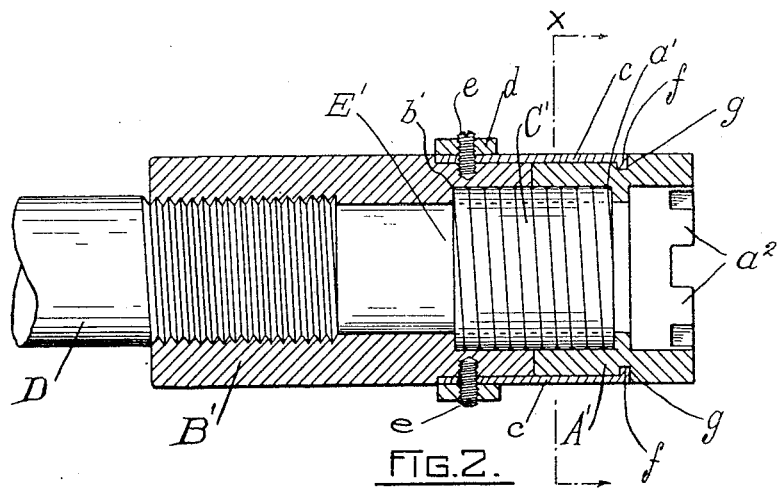
Figure 3:
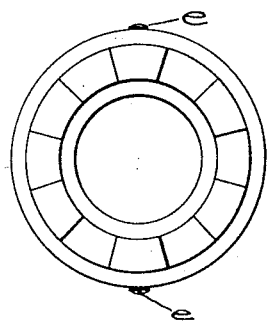
Figure 4:
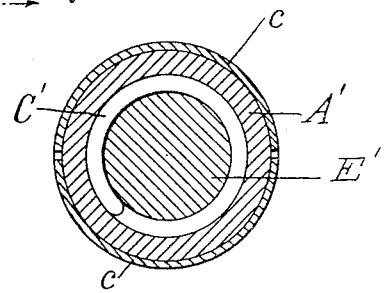
Figure 1:
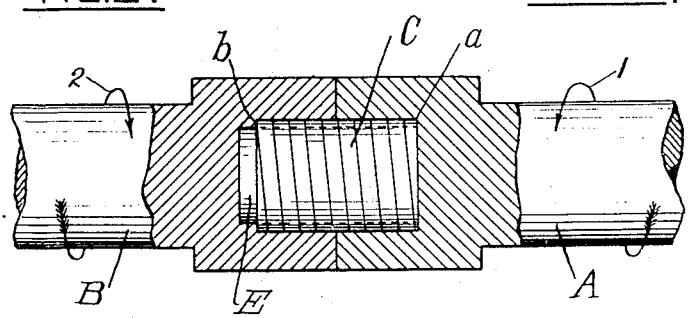

Referring to the drawings, Figure 1 is a view partly in section of one embodiment of the invention and showing the same employed for rotatively connecting two shafts or other parts; Fig. 2 is a longitudinal sectional view showing the invention applied to a shaft such as the crank-shaft of an automobile; Fig. 3 is an end view of the construction shown in Fig. 2; and Fig. 4 is a transverse section on the line $x$—$x$ of Fig. 2.

Referring to Fig. 1, A, B, are two shafts to be rotatively connected and disconnected. Either of said shafts may be the driver and the other the driven shaft. The shaft A is provided at its end with a cylindrical recess $a$, and the shaft B is provided with a corresponding recess $b$. As shown each shaft is enlarged somewhat at the end to enable the recess formed therein to be of a larger diameter. Inserted in the recesses $a$, $b$, is a spiral spring C, one end of said spring being received in one of said recesses and the other end in the other recess, the construction being preferably such that the ends of the two shafts will come together and so that the spring C will be wholly inclosed throughout its length.

It is desirable that the spring C should, when in position in the recesses $a$ and $b$, snugly fit therein. To secure this result it is preferred that the external diameter of the spring in its normal condition should be slightly larger than the internal diameter of said recesses. With this construction of parts one end of the spring may be inserted in one of the recesses by presenting the parts end to end and at more or less of an angle to each other, and so that the wall of the recess will be caused to engage the end coil of the spring, when, by turning the shaft in a direction to wind up the spring, the spring itself being held from turning, the frictional engagement of the wall of the recess with the exterior of the spring will serve to wind up the spring and thus reduce its diameter to an extent sufficient to permit the spring to pass into the recess with a close running fit. The other end of the spring may then be inserted in the recess in the other shaft in the same manner.

With the parts thus assembled the operation of the construction above described is as follows: Assuming the shaft A to be the driver and the shaft B to be the driven shaft, if the shaft A be turned in the direction of the arrow 1 in Fig. 1, this will, by reason of the frictional engagement of the spring with the wall of the recess $a$, have the effect to wind up the spring C, thereby reducing its diameter sufficiently so that said shaft A will turn freely with relation to said spring C. As a result, therefore, no rotary motion will be imparted to the shaft B, which will remain stationary. If now the shaft A be rotated in the opposite direction, this will have the effect to unwind the spring, as it were, and to cause said spring at one end to tightly hug the wall of the recess $b$ in the shaft B. Through the connection of the spring C, therefore, the rotation of the shaft A will cause the shaft B to be correspondingly rotated. As will be seen, the same results will follow if the shaft B be employed as a driver. Thus if the shaft B be turned in the direction of the arrow $a$ in Fig. 1, the effect will be to unwind the spring C and so that through said spring the rotary motion of the shaft B will be imparted to the shaft A. If, on the other hand, the shaft B be rotated in the opposite direction, the effect will be to wind up the spring sufficiently to permit said shaft B to turn freely with relation to said spring and so that rotary movement will not be imparted to the shaft A.

The construction shown in Fig. 2 is especially adapted for use in connection with the crank-shaft of an automobile. In this construction D represents the crank-shaft, to which is secured as by screw-threads the sleeve B', having the recess $b'$. The sleeve A' is likewise provided with the recess a', the two recesses a' and b being adapted to receive the spring C'. The sleeve A' is provided with clutch-teeth a² adapted to be engaged by corresponding clutch-teeth on a crank-handle (not shown). For the purpose of holding the sleeve A' in proper relation to the sleeve B' two semi-cylindrical plates c c are employed. These plates are secured at one end to the sleeve B' by means of a ring d and screws e. The opposite end of each of said plates c is provided with an inwardly projecting flange f adapted to enter an annular groove g formed in the sleeve A'. The operation of this construction is the same as that of the construction shown in Fig. 1. Thus if by the application of a crank-handle or other device, the sleeve A' be turned in a clockwise direction, the effect will be to unwind the spring C' and thus cause said spring to tightly hug the walls of the recesses a' and b', and so that the rotation of the sleeve A' will, through the connection of the spring C', impart a corresponding rotation to the sleeve B' and the crank-shaft D. When the sleeve A is rotated in the opposite direction, however, no rotation will be imparted to the crank-shaft. In this construction, as will be seen, the sleeve A' may conveniently be given a partial rotation first in one direction and then in the other, as in the case of an ordinary ratchet-clutch, instead of a continuous rotation in one direction. As will also be understood, the rotation of the crank-shaft D when operated by power will be in a direction to wind up the spring C', and so that the sleeve B' will turn freely with relation to said spring, provided there is sufficient resistance to the turning of the sleeve A'.

It is preferred to make use of a solid core or plug located within the spring, although in many cases, and especially in structures of a small size, such core or plug may be omitted. It has been found in practice, however, that in structures of a comparatively large size, when no core within the spring is employed, there is more or less of a tendency for the spring, when the driving shaft or sleeve is turned in a direction to wind up the spring, to become somewhat more reduced in diameter at its middle portion than at its ends, and so as to cause a certain amount of reaction or back movement when the turning of the shaft or sleeve is discontinued. It has been further found that by employing a core within the spring of slightly less diameter than the internal diameter of the spring when in its normal condition such reaction or back movement is prevented, this being due to the fact that such core prevents the undue reduction of the diameter of the spring at its middle portion.

In Fig. 1 the core or plug E is shown as a separate piece inserted within the spring C. In the construction shown in Fig. 2 the end of the shaft D is reduced in diameter, said reduced end being extended within the spring to form a core E'.

The friction clutch above described is adapted for use in many and varied relations and wherever it is desired that rotation of a driving member in one direction shall impart rotation to a driven member, and that rotation of said driving member in the opposite direction shall not impart rotation to such driven member.

What I claim as my invention and desire to secure by Letters Patent is:

1. A friction clutch comprising two members, each of said members being provided with a recess, and a spring located in said recesses and adapted to rotatively connect said members.

2. A friction clutch comprising two members, each of said members being provided with a recess, and a spring located in said recesses and adapted to rotatively connect said members when one of them is rotated in a direction to unwind said spring.

3. A friction clutch comprising two members, each of said members being provided with a recess, and a spring located in said recesses and adapted to rotatively connect said members when either one of said members is rotated in a direction to unwind said spring.

4. A friction clutch comprising two members, each of said members being provided with a recess, a spiral spring located in said recesses and adapted to rotatively connect said members, and a core located within said spring.

5. A friction clutch comprising two members, each of said members being provided with a recess, a spiral spring located in said recesses and adapted to rotatively connect said members when one of them is rotated in a direction to unwind said spring, and a core located within said spring.

6. A friction clutch comprising two members, each of said members being provided with a recess, a spiral spring located in said recesses and adapted to rotatively connect said members when either one of said members is rotated in a direction to unwind said spring, and a core located within said spring.

ERICK B. PETERSON.

Witnesses:
W. H. THURSTON,
J. H. THURSTON.